June 25, 1940.  G. H. SMITH  2,205,499

METHOD OF CUTTING METALS

Filed April 27, 1937

INVENTOR
GEORGE H. SMITH
BY
*E. Greenewald*
ATTORNEY

UNITED STATES PATENT OFFICE 2,205,499

METHOD OF CUTTING METALS

George H. Smith, Kenmore, N. Y., assignor to The Linde Air Products Company, a corporation of Ohio Application April 27, 1937, Serial No. 139,269

7 Claims. (Cl. 148—9)

This invention relates to the art of cutting metals in which a jet of oxidizing gas, such as oxygen, is applied to successive heated portions of the surface of a metallic body in order to cause oxidation and melting of the metal and thereby produce a cut or kerf.

In cutting metal bodies by means of a jet of oxygen, usually produced by the passage of a stream of oxygen through an appropriate expansion orifice, greater economy is obtained by producing as narrow a kerf as possible, since the removal of the least amount of metal will require a minimum quantity of oxygen. In addition, it is known that, for a constant oxygen consumption, an increase in cutting speed or rate of advance of the jet with respect to the work causes more oxygen to be used in the upper or entrance portion of the kerf, leaving less available for the lower or emergent portion of the kerf so that the removal of metal in the emergent portion of the kerf tends to fall behind the removal of metal in the entrance portion of the kerf with a consequent "lag" which tends to retard or limit the cutting speed.

Figure 1:
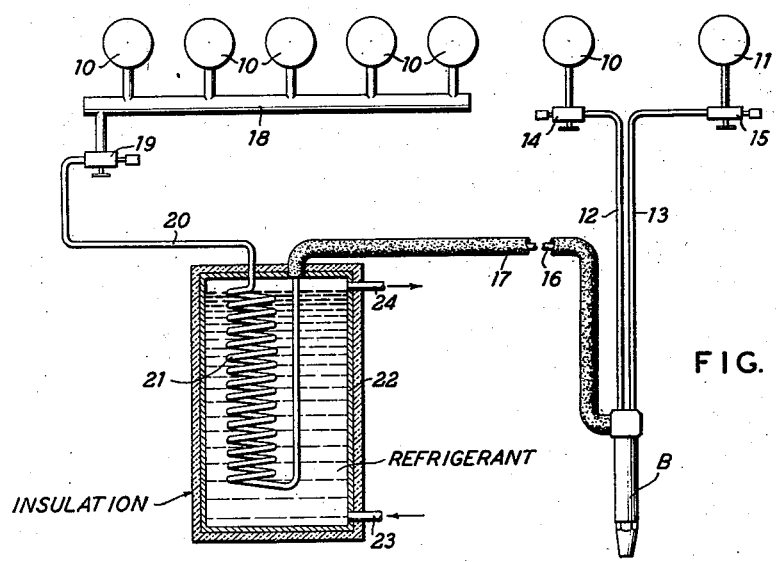
Figure 2:
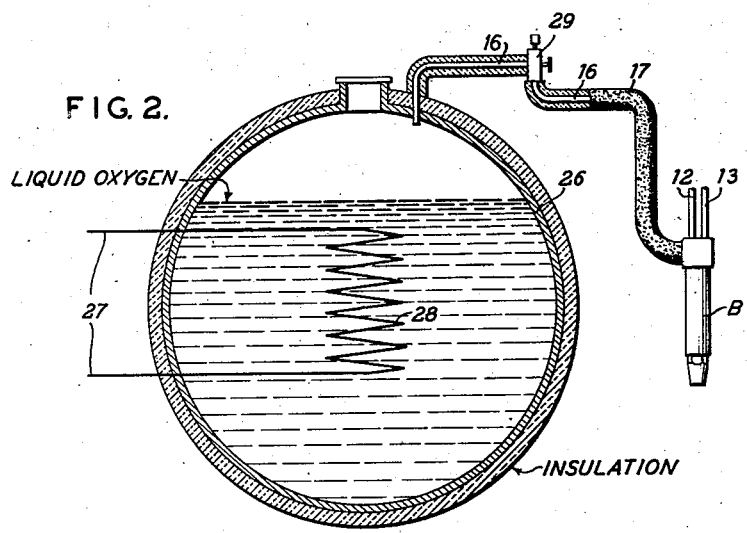

The objects of this invention are to provide a method of cutting metals by means of a jet of oxygen in which the jet is adapted to produce a narrower kerf and thus increase the economy of the operation; to provide such a method in which a greater amount of oxygen is made available for the emergent portion of the kerf and thus permit an increase in the speed of cutting; and to provide such a method which may be performed in a simple and easy manner. Other objects and advantages will become apparent from the following description and accompanying drawing, in which:

Figs. 1 and 2 are schematic illustrations of two forms of apparatus adapted primarily to supply cooled gaseous cutting oxygen to a blowpipe.

In accordance with this invention, the temperature and pressure of the stream of oxygen which is expanded to form the cutting jet are so controlled that the product of the velocity and density of the jet after expansion will be greater than that now normally obtained. This product of the velocity and density of the oxygen in the cutting jet, which may be termed the "mass-velocity," when increased, will permit a greater amount of oxygen to be introduced through a jet of any given width or diameter; or, from another standpoint, for any given rate of flow, a narrower width or diameter of jet is produced when the mass-velocity is increased. A more economical cut is made by utilizing a jet having a high mass-velocity, since an increase in cutting speed and a decrease in the oxygen consumption may be obtained by utilizing a jet having a relatively small diameter for the amount of oxygen available for the removal of metal, since the width of the kerf will correspond to the width or diameter of the jet, and the oxygen consumption per linear foot of cut decreases with the width of the kerf.

A possible explanation of the results obtained by the application of the principles of this invention may be deduced from the "continuity Equation" of thermodynamics, which states that the total mass of gas entering any section is equal to the total mass of gas leaving the section, or:

$G$ (mass rate of flow) $=$
$$\frac{F \text{ (Cross-sectional area)}\cdot W \text{ (velocity)}}{v \text{ (specific volume)}}$$

or $$F = \frac{Gv}{W}$$

Since the density, $d$, is the inverse of the specific volume $v$, then:

$$F = \frac{G}{Wd}$$

Since the area $F$ is proportional to the square of the diameter of the section, and the width of a cylindrical jet is determined by the diameter thereof, then the width is proportional to the square root of $$\frac{G}{Wd}$$

The width of the jet will also determine the width of the kerf, and it can be seen that an increase in the density will result in a decrease of the jet diameter and kerf width, and that a maximum mass-velocity, i. e. $Wd$, will permit the highest rate of flow $G$, so as to permit the introduction of the greatest amount of gas into a kerf of any given width, and also that, for any given rate of flow $G$, a maximum mass-velocity, $Wd$, will produce the narrowest kerf.

A further possible explanation of the results obtained by the application of the principles of this invention may be deduced from the fact that jets of high mass-velocity, when moving across the face of the reactive zone in the kerf, apparently have a greater scouring action in mechanically removing the surface oxide and oxidizing films, thereby increasing the speed of the oxygen diffusion into the reactive center. A still further possible explanation may be deduced from the fact that the velocity of a chemical reaction increases with the active mass of the reactants, and consequently oxygen having a high density would tend to react more rapidly with iron than oxygen having a low density.

Since cutting jets are produced by the expansion in a nozzle of a stream of oxygen from a higher to a lower pressure, the manner in which the pressure and temperature may be controlled in order to produce an increased mass-velocity will be considered. Such nozzles are provided with a gas passage which has an inlet portion and a restricted orifice or discharge portion between the inlet and the mouth of the passage. Oxygen is supplied to the inlet at a pressure above atmospheric, and in passing through the orifice or discharge portion, the pressure drops and the oxygen consequently expands. During this drop in pressure and resulting expansion, the potential energy of the oxygen is converted into kinetic energy to provide a high velocity jet. Ordinarily, when the pressure of oxygen in the inlet portion of the passage increases, the velocity of the oxygen jet discharged from the mouth of the nozzle increases.

Nozzles generally in use are provided with a passage having a cylindrical discharge orifice, but the velocity of a jet produced in such nozzles is limited. As the inlet pressure increases, the mouth or discharge pressure will remain at atmospheric pressure and the velocity of the jet will increase until the ratio of the atmospheric pressure to the inlet pressure is 0.53, at which the jet acquires its maximum velocity, and a further increase in the inlet pressure will not produce an increase in velocity, but only an increase in the mouth or discharge pressure. This is due to the fact that the discharge pressure of gas passing through a cylindrical orifice can theoretically be no less than 0.53 of the inlet pressure, but this ratio may be slightly decreased due to friction and other losses in the nozzle. Thus, when the inlet pressure is 28 pounds per square inch absolute, and discharge occurs at atmospheric pressure, or when the inlet pressure is greater than 28 pounds per square inch absolute and discharge occurs at pressures above atmospheric, the velocity of the jet will be the same, i. e., the maximum velocity. This maximum velocity is termed the "acoustic velocity," since it exactly corresponds with the velocity of sound in the gas in the discharge portion, and, in the case of oxygen having a temperature of about 70° F. in the inlet portion, is approximately 978 feet per second. An appropriate increase in the inlet pressure so that the discharge pressure will be from 10 to 15 pounds per square inch gage has generally been found desirable, since the slight radial expansion of the jet as it passes through the kerf will tend to compensate for the loss in oxygen due to oxidation as the jet passes down through the kerf, and thus tend to produce walls more nearly parallel. However, when the discharge pressure is considerably greater than 15 pounds per square inch gage, the radial expansion of the jet in the atmosphere will be so great as to cause an over-expansion of the jet which will produce sufficient turbulence in the jet to reduce the velocity thereof, and which will also produce a considerable amount of unevenness in the walls of the kerf. Such an uneven condition is obviously undesirable.

It has been proposed to increase the speed of cutting by preheating the stream of oxygen before passage through the orifice of a cylindrical nozzle to increase the chemical activity of the cutting oxygen, and also to dispense with the need for preheating at the start of the cut and supplementary heating during the cutting operation. While such preheating will increase the velocity of the cutting jet, due to the higher acoustic velocity caused by the increased inlet temperature and the consequent higher discharge temperature, it is, in reality, detrimental both to economy and rapidity of cutting because the decrease in density of the oxygen in the jet will more than offset the increase in velocity due to the higher temperature, and the result will be that considerably less oxygen will be discharged for any given diameter or width of jet. Thus, it is impossible to increase the mass-velocity of a cutting jet issuing from a cylindrical nozzle merely by heating to increase the velocity.

In accordance with this invention, the oxygen, before passage through the orifice of a cylindrical nozzle, is cooled to produce a jet having a mass-velocity greater than that of a jet formed from a stream of oxygen at normal temperatures. While the velocity of a jet formed from a stream of oxygen at a lower temperature is less due to the lower acoustic velocity, the increase in density more than offsets the decrease in velocity, so that an increased mass-velocity will result. In other words, through cooling, the amount of oxygen which can be supplied by a jet of any given diameter or width will be increased, or, the diameter or width of jet will be decreased for any given amount of oxygen delivered by the jet.

A higher inlet pressure in a cylindrical nozzle will produce an increase in the density of the jet; but due to the aforementioned turbulence and other undesirable results, the utilization of higher inlet pressures in cylindrical nozzles is usually not desirable.

Certain types of nozzles which have lately been developed but have not as yet come into general use, termed "divergent" nozzles, are provided with an orifice and a discharge portion beyond the orifice which has diverging walls. Such diverging walls, if properly proportioned, permit the oxygen to expand during passage through the discharge portion and set up a reaction which has an axial component tending to accelerate the oxygen jet so that it will be discharged from the mouth at a velocity considerably greater than the acoustic velocity.

Generally speaking, higher inlet pressures are utilized in divergent nozzles than in cylindrical nozzles, and the velocity of the jet issuing from the mouth of the discharge portion may have values of up to or higher than 1800 feet per second. As in the case of cylindrical nozzles, the mass-velocity may be increased by cooling the oxygen before passage through the orifice of a divergent nozzle, so as to increase the density of the oxygen in the jet. The decrease in temperature, as before, will cause a decrease in the velocity of the jet, but the increase in density will more than offset the decrease in velocity.

In divergent nozzles, and in further accordance with this invention, the greatest increase in the mass-velocity is obtained by both cooling the oxygen before passage through the expansion orifice and also utilizing a higher inlet pressure. Since either an increase in pressure or a decrease in temperature will increase the density of the oxygen in the jet, and an increase in pressure also will increase the velocity of the jet, the greatest rapidity and greatest economy in cutting may be obtained by utilizing a higher pressure and also cooling the oxygen to decrease the temperature.

The above principles of this invention may be carried out in a number of ways, such as by use of the forms of apparatus shown in Figs. 1 and 2, in which a blowpipe B is supplied for preheating purposes with gaseous oxygen and a fuel gas, such as acetylene, from high pressure tanks 10 and 11, respectively, through hoses 12 and 13, the pressure being reduced to a desired amount by regulators 14 and 15, while gaseous cutting oxygen at the desired temperature and pressure is supplied through a pipe 16, which may be provided with insulation 17 to prevent heat loss from oxygen at a relatively low temperature. Oxygen at a relatively low temperature may be provided by externally cooling oxygen at an appropriate pressure, or by heating liquid oxygen in order to gasify successive portions of the same and increase the pressure to that desired.

External cooling may be carried out as in Fig. 1, in which oxygen from tanks 10, connected to a manifold 18, is passed through a regulator 19 be means of which an appropriate pressure is maintained, and delivered by a pipe 20 to a coil 21, the outlet of which is connected with the pipe 16. The coil 21 is disposed within an insulated container 22, and a cooling fluid or refrigerant may be circulated in counter-current heat exchange relationship with the cooling coil through inlet 23 and outlet 24 of the container, or an evaporating coolant, such as liquid air, may be placed in the container without circulation through the inlet and outlet, replacement of evaporated coolant being made from time to time as necessary.

Heating and resultant gasification of liquid oxygen may be carried out as in Fig. 2, in which the pipe 16 leads from an insulated vessel 26 containing liquid oxygen which is heated by a coil 28, inlet and outlet lines or leads 27 of which may be connected to a suitable source of electricity, steam, or other heating medium. By means of the heating coil, successive portions of the liquid oxygen are converted to the gaseous phase, thereby increasing the pressure in the vessel and causing a flow of oxygen through the pipe 16, in which a regulator 29 is installed to insure a uniform flow and maintenance of the desired delivery pressure. The extent of heating and gasification is preferably controlled by a suitable switch (not shown) which is responsive to the pressure within the vessel 26, and which in turn controls the electricity or steam flowing through the heating coil. Other ways in which oxidizing gas for cutting can be supplied to the blowpipe B at the appropriate temperature and pressure will be suggested by those just described, but it is to be understood that the method of this invention is not limited to any particular way in which such oxidizing gas is supplied.

The principles of this invention have been employed in cutting steel plate five inches in thickness with divergent nozzles adapted to produce jets having different mass-velocities, with the following results:

| Inlet pressure, lb./sq. in. absolute | Inlet temp., deg. F. | Mass-velocity of jet, lb./sq. ft./sec. | Oxygen consumption, cu. ft./hr. | Maximum cutting speed, ft./hr. | Economy factor cutting/speed/O₂ cons. |
|---|---|---|---|---|---|
| 50 | 268 | 112 | 495 | 30 | .061 |
| 97 | 72 | 170 | 495 | 56 | .113 |
| 174 | 12 | 190 | 407 | 54 | .133 |
| 276 | −36 | 266 | 448 | 63 | .141 |
| 433 | −62 | 300 | 418 | 71 | .170 |

In the above data, the oxygen consumption was measured as of normal temperatures and pressures, so as to provide a common basis for comparison, and the "economy factor," cutting speed divided by oxygen consumption, is thus a true indication of the number of feet of kerf cut per cubic foot of oxygen used.

From the above results, it can be seen that as the mass-velocity of the jet increased, both the cutting speed and the economy also increased.

Although a description of the specific application of the principles of this invention to nozzles having cylindrical orifices and divergent discharge portions has been given, the principles may be applied to nozzles having a cylindrical discharge portion between an orifice and a divergent portion or between a divergent portion and the mouth of the passage. Furthermore, the principles of this invention may be applied to nozzles having passages of elliptical, rectangular or any other cross-sectional shape.

What is claimed is:

1. A method of cutting metals with a stream of oxidizing gas which is expanded to form a cutting jet, comprising the step of cooling said gas stream before expansion so as to increase the mass-velocity of the gas in said jet to above 200 pounds per square foot per second.

2. A method of cutting metals with a jet of oxidizing gas which is directed upon a portion of a metal body to be cut from a nozzle having a passage provided with an expansion orifice and a discharge portion having a substantially increasing cross-sectional area adapted to produce a jet having a velocity greater than the acoustic velocity, such method comprising passing a stream of oxidizing gas through said passage and cooling said stream before passage through said orifice to cause an increase in the product of the density and velocity of gas in said jet to a value greater than about 200 pounds per square foot per second.

3. A method of cutting metals as defined in claim 2, in which a stream of oxidizing gas at an elevated pressure is utilized so as to further increase the product of the density and velocity of the gas in said jet to at least about 300 pounds per square foot per second.

4. A method of cutting metals in which a jet of oxidizing gas is directed against a metal body from a nozzle having a passage provided with an orifice, such method comprising supplying to said passage an oxidizing gas having a temperature below at least 0° F.

5. A method of cutting metals in which a jet of gaseous oxygen is directed against a metal body from a nozzle having a passage provided with an orifice, such method comprising supplying to said passage gaseous oxygen having a temperature below at least 0° F. and a pressure greater than 100 lb. per sq. in.

6. A method of cutting metals in which a jet of gaseous oxygen is directed against a metal body from a nozzle having a passage provided with an orifice, such method comprising supplying to said passage gaseous oxygen having a temperature at least as low as −62° F.

7. A method of cutting metals as defined in claim 6, in which said gaseous oxygen is supplied to said passage at a pressure greater than 400 pounds per square inch absolute.

GEORGE H. SMITH.